Sept. 1, 1964    L. D'EUSTACHIO    3,146,520
IMPACT TYPE STATOR-STRIPPING TOOL
Filed Jan. 16, 1962
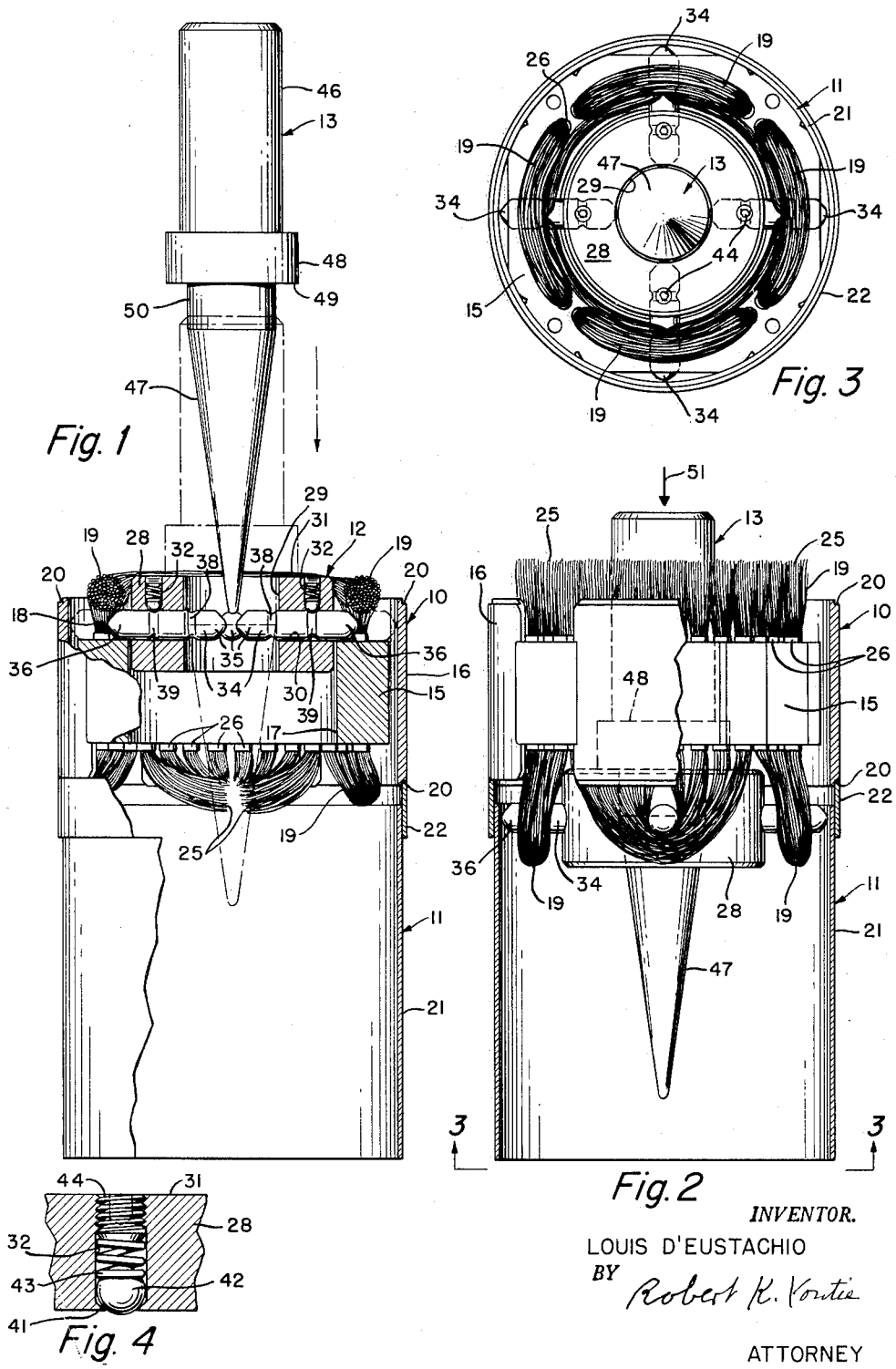
INVENTOR.
LOUIS D'EUSTACHIO
BY Robert K. Youtie
ATTORNEY

United States Patent Office 3,146,520
Patented Sept. 1, 1964

3,146,520
IMPACT TYPE STATOR-STRIPPING TOOL
Louis D'Eustachio, 291 Boxwood Lane, Riverton, N.J.
Filed Jan. 16, 1962, Ser. No. 166,489
5 Claims. (Cl. 29—205)

This invention relates to the rebuilding of electrical machinery, and is especially concerned with a highly improved apparatus for stripping or removing stator coils from motors.

Heretofore, stator stripping, or the removal of coils from stators was a relatively tedious and time-consuming procedure, requiring the burning of the stator to remove insulation before withdrawing the stator coils. This burning is highly objectionable for several reasons, including the objections to smoke in many areas, and also as the burning produces deleterious effects upon the stator laminations, causing the laminations to buckle and often resulting in overheating or running hot of the stator after rewinding. Of course, the burning requirement involves considerable time and expense, in addition to the time consumed in cooling the stators sufficiently to handle.

Accordingly, it is an important object of the present invention to provide a unique apparatus for stripping coils from stators, which overcomes the above-mentioned difficulties, wherein stators may be stripped cold or substantially cold, and which effects considerable savings in equipment, time and labor.

It is still a further object of the present invention to provide stator-stripping apparatus which is extremely simple in construction, durable and entirely reliable throughout a long useful life, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a side elevational view showing apparatus of the present invention in operative condition, illustrating an initial stage of the method herein, partly broken away for increased clarity;

FIGURE 2 is a side elevational view, partly broken away and partly in section similar to FIGURE 1, illustrating a later stage in the method of the instant invention;

FIGURE 3 is a bottom plan view taken substantially along the line 3—3 of FIGURE 2; and FIGURE 4 is an enlarged fragmentary sectional view showing a detail of construction of FIGURE 1.

Referring now more particularly to the drawings, and specifically to FIGURE 1 thereof, a stator is there generally designated 10 and is shown mounted on a hollow tube or support 11. An annular member or insert 12 is shown inserted in the stator, and a drive element, generally designated 13 is illustrated in solid lines in an initial stage of operation, just prior to being driven.

The stator 10 is shown in the condition removed from a motor, and may be entirely conventional, of generally annular configuration having a core 15, and outer pieces 16 arranged circumferentially about the exterior of the core. The core is formed to define a central through opening 17, which receives the rotor in the assembled motor. Of course, as illustrated the stator 10 has been disassembled from a motor, and no rotor is shown.

The stator core 15 is formed with a plurality of longitudinally extending, through openings receiving the coils 18. The coils normally extend longitudinally beyond opposite sides or ends of the core 15, so as to define longitudinally outwardly projecting coil loops 19.

The outer stator parts 16 may be formed at their ends with recesses or notches 20, which is conventional, and facilitates mounting of the stator on the support 11. The support 11 may consist of an open-ended tubular body 21, and an external, tubular extension 22 secured to and extending beyond one end of the body. By this construction, opposite ends of the tubular support 11 are of different diameters. While not essential, this enables a single support 11 to be used in conjunction with different-sized stators.

In the operative condition of FIGURE 1, the stator 10 is shown resting on the upper end of support 11, the grooves 20 of the stator parts 16 conformably engaging within and resting on the upper end part 22 of the support. Of course, the support may rest on any suitable surface, such as a workbench, the bed of a press, or the like.

In the illustrated condition of FIGURE 1, it will be observed that the lower coil loops 19 have been severed, as at 25. Further, it may, under certain conditions be desirable to slightly preheat the stator just sufficiently to soften the varnish of the coils for easier removal. This preheating is not sufficient to substantially impair handling of the stator, and does not burn the insulation, but may be just enough to facilitate withdrawal of the coils and subsequent removal of the insulating paper, such as the tubes or collars 26 extending about the coil portions passing through the core 15.

The insert 12 may include an annular or cylindrical body 28 having its external diameter slightly less than the internal diameter of the stator opening 17 for conforming engagement therein. The cylindrical or annular member 28 has an axial through opening or bore 29. Also, a plurality of radially extending through holes or bores 30 are formed in the annular member 28, being illustrated as four in number, each opening radially inward into the central opening 29 of the annular member and radially outward through the periphery of the annular member. Extending longitudinally inward through one face of the annular member 28, the upper face 31 as seen in FIGURE 1, there are a plurality of holes or bores 32, each located to intersect with a respective hole 30. The upper or outer end region of each hole 32 may be internally threaded, for a purpose appearing presently.

Slidably received in each bore or opening 30 of the annular member 28 is a generally cylindrical pin 34. Thus, the pins 34 are disposed radially with respect to the annular member, and slidable for retraction radially inward and projection radially outward. The pins 34 are all substantially identical, each having its inner and outer ends 35 and 36 generally rounded, and being of a length such that in the fully retracted, solid-line position of FIGURE 1, the outer ends 36 project slightly beyond the peripheral surface of annular member 28. That is, in the solid-line, fully retracted position of FIGURE 1, the inner pin ends 35 are in engagement with each other, and the outer pin ends 36 extend somewhat beyond the periphery of the annular member. The pins 34 may each be formed with a pair of inner and outer circumferential grooves 38 and 39, it being observed in FIGURE 1 that the outer grooves 39 are each proximate to a respective bore 32.

Provided in each bore 32, best seen in FIGURE 4, is an inner end constriction 41 at the juncture with the adjacent bore 30. An engaging member or ball 42 may be located in each bore 32 resting on the associated constriction 41 and projecting slightly therethrough into the adjacent bore 30. Bearing against the engaging member or ball 42 is a resilient element or coil spring 43, within the bore 32; and, a recessed head screw or fastener 44 may be threaded in each bore 32 bearing against the adjacent spring 43 to resiliently maintain the ball 42 in engagement with the constriction 41 and projecting slightly therethrough. Thus, the ball 42, spring 43 and screw 44 combine to define a resilient or spring-pressed ball detent.

As best seen in FIGURE 1, in the solid-line, fully retracted position of pins 34, the spring-pressed balls 42 engage in the outer grooves 39 of the pins 34 to releasably hold the pins in their retracted position. Of course, the pins may be projected radially outward by force sufficient to depress the balls 42 entirely into their respective bores 32. The pins 34 may also be held in a radially projected position, as shown in phantom in FIGURE 1, in which position the holding balls 42 will engage in the inner grooves 38 of the pins, to releasably hold the pins in their projected position.

The drive element 13 may be of elongate, rodlike formation having at one end a generally cylindrical handle part 46, and having its other end region generally conical or outwardly tapering, as at 47. The handle part 46 may be peripherally knurled, if desired, to facilitate handling. Extending circumferentially about the drive element 13, spaced intermediate the ends thereof, adjacent to but spaced from the tapering portion 47, there may be provided a circumferentially extending abutment or annular collar 48. The collar 48 is fixedly secured to the drive element 13, and may be formed integral therewith, or separate therefrom, as desired.

Thus, the annular abutment member or collar 48 defines on one side an annular shoulder 49 extending circumferentially about the cylindrical region of drive element 13, which shoulder faces toward the tapering or pointed end 47. It will be observed that the collar 48 is spaced from the tapering region by an intermediate cylindrical portion 50 of the drive element.

In the solid-line condition of FIGURE 1 is illustrated an initial stage of the operation. The insert 12 has been placed on the upper end of support 11, the outer or shell pieces 16 conformably engaging with the upper end edge of the support, and the stator being arranged with the uncut coil loops 19 uppermost.

In this condition, the annular member 28, with its pins 34 retracted, is engaged between the upper coil loops 19 and partially into the upper end of the annular core 15. The pins 34, even in their retracted positions, have their radially outer ends projecting somewhat beyond the outer peripheral surface of the annular member 28; and, while the annular member is of a diameter to freely engage in the core 15, the outer ends 36 of the retracted pins 34 project beyond the annular member so as to engage with the upper end of the core and prevent further insertion of the annular member into the core. The annular member 28 is angularly oriented to place the pins 34 each in alignment with a respective coil loop 19.

The drive element 13 may then be moved longitudinally downward from its solid-line position, to its dot-and-dash-outline position. In such movement, the tapering portion 47 engages the inner pin ends 35 and operates as spreading means to project the pins radially outward to their phantom positions. The pins are thus projected radially outward through respective coil loops 19, and releasably held in their projected positions by engagement of the detent balls 42 in the inner grooves 38. It will be noted, in the phantom position of FIGURE 1, that the cylindrical portion 50 of the drive element 13 is received in the central opening 29 of the annular insert 28, and that the shoulder 49 of abutment 48 rests on the upper surface 31 of the insert.

The drive element 13 may then be removed, and the stator 10, together with the annular member 28 may be inverted and replaced on the support 11, as shown in FIGURE 2.

In this condition, the outer stator parts or shell pieces 16 rest on the upper end of the support 11 in the same manner as described hereinbefore; however, the insert 28 is now on the underside of the stator with its pins 34 projected radially outward through respective uncut coil loops 19 on the underside of the stator.

The drive element 13 is again engaged longitudinally downward through the annular member 28, until the shoulder 49 of collar 48 engages with the insert. The assembly may now be placed in any suitable press, and the drive element 13 forced downward through the stator 10, as indicated by the arrow 51. As the now upper coil loops 19 have been cut, continued downward movement of the drive elements 13 with their pins 34 engaged through the uncut lower coil loops 19, serves to draw the coils downward through and out of their slots in the core 15. This operation is shown in FIGURE 2.

Upon downward movement of the drive element 13 beyond that shown in FIGURE 2, the coils 18 are completely withdrawn from the stator 10. It is then only necessary to remove the loose insulation 26, as by shaking the stator, manually picking out the insulation, or otherwise. The stator is then ready for rewinding.

From the foregoing, it is seen that the present invention provides a unique and highly improved apparatus for stripping stators of electrical machinery, which is well-adapted to meet practical conditions of manufacture and use, and otherwise fully accomplishes its intended objects.

Although the present invention has been described in some detail by way of illustration and example for purposes of clarity of understanding, it is understood that certain changes and modifications may be made within the spirit of the invention and scope of the appended claims.

What is claimed is:

1. Apparatus for stripping an annular stator of coils having loops extending from opposite ends of the stator, said apparatus comprising an insert member insertible axially into a stator, a plurality of pins mounted in said insert member for radial retraction permitting said insertion of said insert member and for projection into coil loops at one end of said stator, spreader means for projecting said pins, and removal means for removing said insert member from said stator through said one end thereof to withdraw said coils, said insert comprising an annulus conformably engageable in a stator, said spreader means comprising an elongate drive element having one end tapered for engagement with the radially inner ends of said pins to project the latter radially outward upon longitudinal movement of said drive element, and said removal means comprising an abutment on said drive element for engagement with said annulus after projection of said pins to drive said annulus from said stator and withdraw said coils.

2. Stator-stripping apparatus comprising an annular member conformably insertable axially within a stator, a plurality of radially disposed pins mounted in said annular member for radial retraction permitting said insertion of said annular member and for radial projection into the stator coils, a spreader insertable through said annular member to project said pins, and an abutment engageable with said annular member to remove the latter from said stator and simultaneously withdraw the stator coils.

3. Stator-stripping apparatus according to claim 2, said spreader comprising an elongate drive element having one end tapered for engaging the inner ends of said pins to project the latter radially outward upon longitudinal movement of the drive element through said annular member.

4. Stator-stripping apparatus according to claim 3, said abutment comprising a shoulder on said drive element engageable with said annular member upon continued longitudinal movement of said drive element through said stator.

5. Stator-stripping apparatus according to claim 3, in combination with an open support for holding a stator upon driving of said drive element.

References Cited in the file of this patent

UNITED STATES PATENTS

| | | |
|---|---|---|
| 1,472,833 | Herold | Nov. 6, 1923 |
| 1,511,773 | Riedesel | Oct. 14, 1924 |
| 1,535,534 | McDonald et al. | Apr. 28, 1925 |
| 1,641,754 | Glover et al. | Sept. 6, 1927 |
| 1,902,551 | Fredrickson | Mar. 21, 1933 |
| 2,874,457 | Bennett | Feb. 24, 1959 |
| 3,010,191 | McCullough | Nov. 28, 1961 |